United States Patent Office 2,698,844
Patented Jan. 4, 1955

2,698,844
PRODUCTION OF NUCLEOSIDES

Karl Josef Dimroth, Marburg (Lahn), Kurt Georg Viktor Holle, Mannheim-Waldhof, and Reiner E. Hamm and Lothar Jaenicke, Marburg (Lahn), Germany, assignors to Zellstoffabrik Waldhof, Mannheim-Waldhof, Germany, a company of Germany No Drawing. Application January 20, 1950,
Serial No. 139,782

Claims priority, application Germany January 22, 1949

6 Claims. (Cl. 260—211.5)

According to the already known method the production of nucleosides by hydrolytic cleaving of nucleic acid can be carried out in a 3–4 hours treatment with ammonia at a temperature of 175–180° C. In this case a mixture of the purine- and pyrimidine-nucleosides is obtained.

The disadvantage of this process consists in obtaining a low yield and in being forced to work with pressure-vessels. If treated under more moderate conditions, e. g. at 115° C., the nucleic acid is only relegated into the mono-nucleotides.

For this reason it was suggested (German Letters Patent No. 693,416) to use volatile organic bases e. g. pyridine, quinoline etc., a procedure by which the cleaving of nucleic acid will be accomplished in approximately 96 hours. The yield of guanosine and adenosine is considerably higher than that realized by using ammonia; however, pyridine is a very expensive cleaving-agent.

It was found as a surprise that the hydrolysis of the nucleic acid can also be accomplished without employing the usual inorganic and organic bases by using a neutral aqueous solution at a pH-value of 6.5–8, preferably 7–7.5, the pH-value being kept constant by combining the phosphoric acid nascient by the cleaving-process with the aid of proper additions, for instance by conversion into insoluble phosphates, by buffering or by re-esterification.

Among other processes this can be brought about by adding to the mixture of nucleic acid and water (if necessary with the aid of organic solvents as for instance alcohols, polyalcohols, ethers etc. which are able to dissolve the nucleic acid) metallic hydroxides or metallic salts of low solubility which together with the phosphoric acid form insoluble phosphates.

Lead hydroxide, zinc hydroxide as well as the hydroxides and carbonates of magnesium, calcium and barium are especially useful for this process. In order to carry out the hydrolysis, the suspension of nucleic acid is heated until the separation of the phosphoric acid is completed. The advantage of this is that the cleaving-conditions are especially mild and that the employment of expensive chemicals is no longer necessary.

The precipitated and washed metallic hydroxide that has been obtained from acetates of lead or similar water-soluble products (e. g. from acetate of lead according to a known procedure, for instance with the aid of soda-lye and a corresponding heating) is added together with water to the nucleic acid at an excess of 10–20% (computed for phosphoric acid). The cleaving is accomplished by prolonged boiling, e. g. 50–80 hours at normal pressure and simultaneous stirring or by heating to 110–140° C. in a pressure vessel. The pH-value of this mixture shall be 4–9, ranging constantly between 7–8.

By the hydrolysis with lead hydroxide, guanosine-crystals form after removal of the lead-phosphate residue when cooling down the solution; which is separated and cleaned. Adenosine and the other nucleosides are produced from this filtrate by already known processes. The methods indicated in the examples prove to be of special advantage.

When hydrolyzing with zinc-hydroxide, the residue contains zinc-salts of the nucleotides which are separated by the known methods of fractional precipitation or cleaving off into nucleosides which may be continued with water at 150° C., in a second step.

Addition of inorganic or organic buffer solutions allows to easily keep the pH-range that is desirable for cleaving. The nascient phosphoric acid is buffered and therefore is stopped from further cleaving the nucleosides which are generated. Therefore the desired hydrolytic cleaving of the nucleic acid is not specifically due to the cleaving-agent but to means that maintain a determined range of pH-values.

If pressure-vessels are avoided the hydrolysis can often be carried out considerably faster than was feasible up to now. Often the solubility-conditions are so favourable that upon the cooling-down certain nucleosides as for instance guanosine precipitate immediately from the solution and may be obtained in a comparatively pure form. Thus, the nucleoside-yields being equal, these new methods constitute a considerable technical simplification and an essential lowering of costs, as compared with the present methods.

The process described in this invention may also be carried out by advantageously cleaving the nucleic acid with the aid of water-soluble acid amides or water-soluble substituted acid amides in the presence of water. Similar to the use of pyridine the cleaving of the nucleic acid is carried out when heated with the acid amides. As compared with the mentioned organic bases the acid amides allow more rapid cleaving and the use of considerably cheaper chemicals. For instance, cleaving takes 10–13 hours when formamide is used. In addition to this the relations of solubility are especially favourable: While the nucleic acids dissolve quickly the guanosine precipitates immediately upon cooling down the hydrolyzed mixture and can be separated. To separate the guanosine the customary pyridine process requires previous evaporation of the solvent. The cleaving of nucleic acid can be carried out with all ordinary and substituted acid amides and the reaction is smooth. At the cooling down guanosine settles out. Adenosine and the pyrimidine-nucleosides can be obtained from the filtrate by the known methods.

The desired cleaving of the nucleic acid can also be advantageously brought about by using either acyclic or cyclic water-soluble ethers. When nucleic acid is heated with solutions of this type a correct separation with phosphoric acid takes place. The reaction is more rapid than when pyridine is used and the reagents are considerably cheaper.

Best results have been obtained with Dioxan-water and tetrahydrofuran-water mixtures. When the reaction is finished guanosine settles out during cooling. From these precipitates adenosine and pyrimidine-nucleosides can be obtained by known methods after filtration.

Example 1

100 g. of unrefined nucleic acid in 1000 cc. of water which by addition of soda-lye have been neutralized to pH-7 are prepared with 40 g. of precipitated calcium carbonate and boiled in a reflux-cooler for seven days.

After removal of the unsolved portion the guanosine crystallized out and can be separated. If the guanosine settles out as jelly it can be cleaned by the known processes with the aid of lead compounds. Adenosine and the pyrimidine-nucleosides are obtained from this filtrate by the known process. Yield: 10 g. of guanosine and 8 g. of adenosine.

Example 2

In a jar with reflux-cooler 100 g. of unrefined nucleic acid together with freshly precipitated and washed lead hydroxide (obtained from 135 g. lead acetate) and 600 cc. of water are heated under rapid stirring to boiling temperature for approximately 70 hours.

The hydrolyzing process is followed by suction in the hot state and by a one-time washing with an amount of boiling water that corresponds to the filtrate. The filtrate-mix is allowed to stand in ice during the night. The settled out guanosine is centrifuged off; 11–12 g. of pure guanosine are obtained by re-crystallization from hot water. The filtrate is vacuum-evaporated at a bath-temperature of 40–50° C. to approximately 80–100 cc. of syrup-consistence and is exhaustingly precipitated on methanol. The solution that has been centrifuged off the flaky sediment is vacuum-evaporated and the remaining oil is seeded with some adenosine. After having been in ice the adenosine settles out; it is suctioned off and re-crystallized from water by which process 6.5 g. of pure adenosine are obtained.

Additional adenosine can be precipitated from the mother-lye as picrate. After removal of same the pyrimidine-nucleotides can be obtained by the usual method.

*Example 3*

110–120% of the theoretically required amount of lead acetate computed for the respective $P_2O_5$-content of the nucleic acid (for instance at a $P_2O_5$-content of 19.0% = 170–185 g. lead acetate) are dissolved by heating in approximately 500 cc. of water. The lead hydroxide is precipitated by addition of soda-lye and is washed out with water (pH: 7–8). Further treatment corresponds to the description under Example 2.

*Example 4*

The precipitated lead hydroxide is increased to 500 cc. with the aid of water and is added to the nucleic acid that has been suspended with water in a three-neck jar. The mixture is heated with stirring and at boiling temperature is correctly adjusted to pH 7.5. The mixture is boiled for 72 hours, the pH-value remaining unchanged. The finishing off is the same as described in Example 2.

*Example 5*

The albumen-containing adenosine mother-lye that is free from guanosine and has been produced as described under Example 2 is vacuum-evaporated to syrup-consistence at a bath-temperature of 40–50° C. The syrup is mixed with water in an amount to a total of 100–150 cc. and precipitated with three-times the quantity of methanol. Further finishing off is carried out as described in Example 2.

*Example 6*

100 g. of unrefined nucleic acid in 750 cc. of water with a slight excess of lead hydroxide are heated in a pressure-vessel for 1½–2 hours with stirring and at pH 7 to attain an internal temperature of 135° C. After the working up as indicated in Example 2, 8 g. of guanosine and 35 g. of adenosine-picrate are obtained, from which pure adenosine can be obtained by the usual methods.

*Example 7*

100 g. of unrefined nucleic acid in 750 cc. of water with an excess of freshly precipitated zinc-hydroxide are recyclingly heated up to boiling temperature with stirring and at pH-7. After the hydrolysis which takes 36–50 hours filtration is made in the hot state: The filtrate only contains little organic substance; the bulk is combined with zinc and can be obtained from the residue by fractional precipitation of the zinc-salts and ammonium-salts in the form of nucleotides (guanylic-acid, adenylic-acid, cytidylic-acid and uridylic-acid) by already known processes. (Jones and Perkins J. Biol. Chem. 55,557.)

*Example 8*

The zinc-deposit from a mixture of 175 g. of unrefined nucleic acid, see Example 7, is suspended in 1 litre of water and is autoclaved for 1½ hours to attain an internal temperature of 150° C. After sucking off in the hot state the guanosine is allowed to crystallize out from the filtrate which is then evaporated. As indicated in the processing standard under Example 2, 11.2 g. of adenosine are obtained.

After a repeated hydrolysis under equal conditions the zinc-deposit which has been sucked off after the first hydrolysis yields additional guanosine and adenosine as picrate (20 g. of raw picrate) from which again 7.2 g. of pure adenosine can be obtained.

*Example 9*

110 g. of unrefined nucleic acid are brought to suspension in 200 cc. of water, its pH being adjusted to 7, with soda-lye and are diluted with 10–20 times the quantity of buffer-solution having a pH-value of 7 (sodium citrate and soda-lye) which is followed by 9–10 days boiling at the reflux-cooler. Then the guanosine precipitate is filtered off. Yield: 10 g. Hereafter the adenosine is separated directly or as compound of difficult solubility.

*Example 10*

50 g. of unrefined nucleic acid with 200 cc. of a formamide-water mixture (1:1) are heated at the reflux-cooler for 11 hours at a temperature of 130° C. During the cooling down the solution solidifies into a gelatinous consistency.

When cooled down and solidified the solution is centrifuged and the voluminous guanosine-residue is re-crystallized from hot water. Upon double re-crystallization 6 g. of guanosine are obtained in the form of long needle-shaped and snow-white crystals having a silky lustre.

Pure guanosine is also obtained if the gelatinous consistency is allowed to stand in ice for some hours, is then centrifuged and three times re-crystallized from water. (Yield: 6 g.)

Formamide may be replaced by other acid amides or substituted acid amides such as methylformamide or dimethylformamide.

The known methods can be followed for the extraction of adenosine and the pyrimidine nucleosides from the filtrates.

Having now ascertained and particularly described the nature of our said invention and in what manner same is to be performed, we declare that what we claim is:

1. In a method of producing nucleosides by hydrolytic cleavage of nucleic acid, the step comprising heating nucleic acid, the step comprising heating nucleic acid in an aqueous solution, said solution being adjusted to a pH value of approximately 6.5–7.5 in the presence of a metal compound capable of combining with the phosphoric acid split off at the cleaving to form insoluble phosphates, the metal in said compound being selected from the group consisting of lead and zinc.

2. In a method of producing nucleosides by hydrolytic cleavage of nucleic acid according to claim 1, in which a crude nucleic acid containing albumen is used as starting material and wherein, after removing the guanosine produced on hydrolytic cleavage of said nucleic acid, the remaining cleavage mother liquor is mixed with a quantity of methanol to produce a methanol-content of 70–80% in the mother liquor to precipitate the albumen present in said mother liquor, the precipitated albumen being removed, and isolating the other nucleosides from the resulting liquid.

3. In a method of producing nucleosides by hydrolytic cleavage of nucleic acid according to claim 1, in which the metal compound is lead hydroxide capable of combining with the phosphoric acid split off during hydrolysis, and of maintaining the pH value at approximately 6.5–7.5 during cleavage of the nucleic acid 4. In a method of producing nucleosides by hydrolytic cleavage of nucleic acid according to claim 1, in which the metal compound is zinc hydroxide capable of combining with the phosphoric acid split off during hydrolysis and of maintaining the pH value at approximately 6.5–7.5 during cleavage of the nucleic acid.

5. In a method of producing nucleosides by hydrolytic cleavage of nucleic acid, the steps comprising heating to a temperature of at least 100° C. an aqueous solution of nucleic acid, said solution being adjusted to a pH value of approximately 6.5–7.5 in the presence of an excess of lead hydroxide of between 10% and 20% calculated with respect to the $P_2O_5$ content of the nucleic acid used, until substantially all of the phosphoric acid of the nucleic acid is split off, removing the insoluble phosphates formed while the reaction mixture is still hot, cooling the resulting solution, separating the guanosine crystals obtained, and isolating the other nucleosides from the remaining solution.

6. In a method of producing nucleosides by hydrolytic cleavage of nucleic acid, the steps comprising heating to a temperature of at least 100° C. an aqueous solution of nucleic acid, said solution being adjusted to a pH value of approximately 6.5–7.5 in the presence of an excess of zinc hydroxide of between 10% and 20% calculated with respect to the $P_2O_5$ content of the nucleic acid used until substantially all the phosphoric acid of the nucleic acid is split off, removing the precipitate formed while the reaction mixture is still hot, heating said precipitate in aqueous suspension under pressure, filtering and isolating from the filtrate the nucleosides.

References Cited in the file of this patent

UNITED STATES PATENTS 2,152,662   Phelps ---------------- Apr. 4, 1939

OTHER REFERENCES

Ser. No. 257,543, Brederick (A. P. C.), published April 20, 1943.

Hawk et al., Practical Physiological Chem., 12th ed., 1947, page 157.

Koch et al., Practical Methods in Biochemistry, 5th ed., 1948, p. 57.